United States Patent
Hanatsuka et al.

(10) Patent No.: US 9,434,387 B2
(45) Date of Patent: Sep. 6, 2016

(54) METHOD AND APPARATUS FOR DETERMINING ROAD SURFACE CONDITION

(71) Applicants: BRIDGESTONE CORPORATION, Tokyo (JP); INTER-UNIVERSITY RESEARCH INSTITUTE CORPORATION, RESEARCH ORGANIZATION OF INFORMATION AND SYSTEM, Tokyo (JP)

(72) Inventors: Yasushi Hanatsuka, Tokyo (JP); Tomoyuki Higuchi, Tokyo (JP); Tomoko Matsui, Tokyo (JP)

(73) Assignees: BRIDGESTONE CORPORATION, Tokyo (JP); INTER-UNIVERSITY RESEARCH INSTITUTE CORPORATION, RESEARCH ORGANIZATION OF INFORMATION AND SYSTEM, Tokyo (JP)

( * ) Notice: Subject to any disclaimer, the term of this patent is extended or adjusted under 35 U.S.C. 154(b) by 0 days.

(21) Appl. No.: 14/419,427

(22) PCT Filed: Aug. 9, 2013

(86) PCT No.: PCT/JP2013/071674
§ 371 (c)(1),
(2) Date: Feb. 3, 2015

(87) PCT Pub. No.: WO2014/025018
PCT Pub. Date: Feb. 13, 2014

(65) Prior Publication Data
US 2015/0210286 A1  Jul. 30, 2015

(30) Foreign Application Priority Data
Aug. 9, 2012  (JP) ................ 2012-176779

(51) Int. Cl.
G06F 11/30  (2006.01)
B60W 40/068  (2012.01)
B60C 99/00  (2006.01)

(52) U.S. Cl.
CPC ............ *B60W 40/068* (2013.01); *B60C 99/00* (2013.01); *B60C 2200/04* (2013.04); *B60W 2530/20* (2013.01)

(58) Field of Classification Search
CPC .. G06K 9/00288; G06K 9/62; G06K 9/6235; G06N 99/005; B60W 40/02
USPC ............. 701/34.4, 30.2, 30.9, 29.1; 340/907, 340/910, 438, 442
See application file for complete search history.

(56) References Cited

U.S. PATENT DOCUMENTS 5,761,326 A * 6/1998 Brady et al. .................. 382/103
7,046,822 B1 * 5/2006 Knoeppel et al. ............ 382/103

(Continued)

FOREIGN PATENT DOCUMENTS

EP  1897706 A1  3/2008
EP  2586629 A1  5/2013

(Continued)

OTHER PUBLICATIONS

International Preliminary Report on Patentability from the International Searching Authority dated Feb. 19, 2015 in counterpart application No. PCT/JP2013/071674.

(Continued)

*Primary Examiner* — Gertrude Arthur Jeanglaud
(74) *Attorney, Agent, or Firm* — Sughrue Mion, PLLC

(57) ABSTRACT

A time-series waveform of tire vibration detected by an acceleration sensor is windowed by a windowing unit, time-series waveforms of the tire vibration are extracted for respective time windows, and feature vectors of the respective time windows are calculated. Then kernel functions are calculated from the feature vectors of the respective time windows and road surface feature vectors, which are the feature vectors for the respective time windows calculated from the time-series waveform of the tire vibration obtained for distinctive road surface conditions calculated in advance. And the road surface condition is determined by comparing values of discriminant functions using the kernel functions. As a result, the road surface condition can be determined from the time-series waveform of the tire vibration without detecting peak positions or measuring the wheel speed. Moreover, robustness against changes in tire size can be added to the determination of the road surface condition.

4 Claims, 7 Drawing Sheets

(56) References Cited

U.S. PATENT DOCUMENTS

| | | | |
|---|---|---|---|
| 8,098,889 B2 * | 1/2012 | Zhu et al. | 382/103 |
| 2005/0137786 A1 | 6/2005 | Breed et al. | |
| 2007/0094170 A1 | 4/2007 | Graf et al. | |

FOREIGN PATENT DOCUMENTS

| | | |
|---|---|---|
| JP | 2007-055284 A | 3/2007 |
| JP | 2007-095069 A | 4/2007 |
| JP | 2008-280038 A | 11/2008 |
| JP | 2011-242303 A | 12/2011 |
| WO | 2011/161844 A1 | 12/2011 |

OTHER PUBLICATIONS

International Search Report of PCT/JP2013/071674 dated Sep. 3, 2013 [PCT/ISA/210].

Communication dated Mar. 11, 2016 from the European Patent Office issued in corresponding Application No. 13828701.6.

* cited by examiner

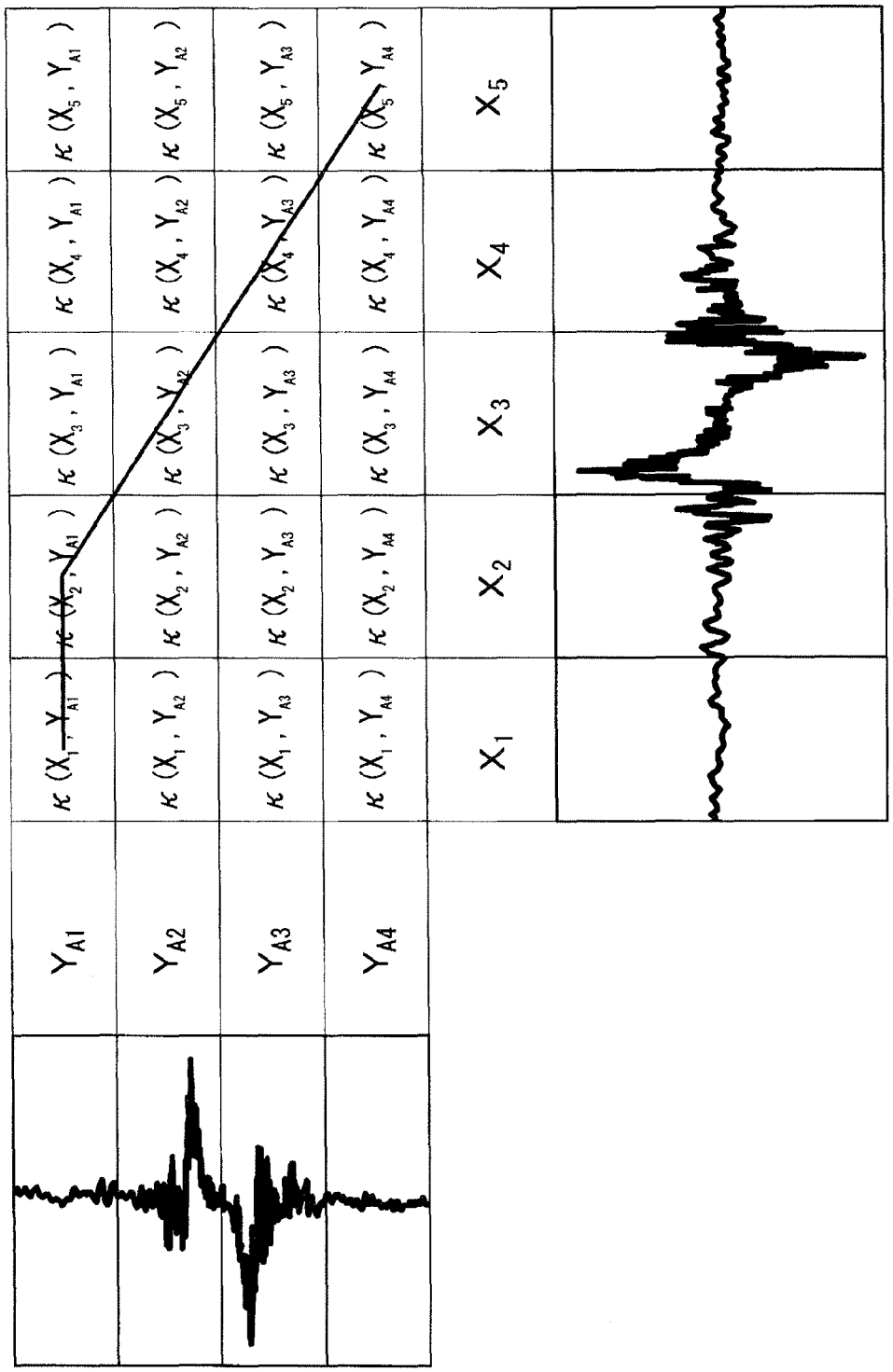

METHOD AND APPARATUS FOR DETERMINING ROAD SURFACE CONDITION

CROSS REFERENCE TO RELATED APPLICATIONS

This application is a National Stage of International Application No. PCT/JP2013/071674, filed Aug. 9, 2013, claiming priority based on Japanese Patent Application No. 2012-176779, filed Aug. 9, 2012, the contents of all of which are incorporated herein by reference in their entirety.

TECHNICAL FIELD

The present invention relates to a method and apparatus for determining the condition of a road surface on which a vehicle is running and, in particular, to a method for determining a road surface condition using time-series waveform data of tire vibration during vehicular travel only.

BACKGROUND ART

There have been conventional methods for estimating a road surface condition by detecting tire vibration during vehicular travel. In such a method, a detected time-series waveform of tire vibration is divided into a plurality of regions, such as "pre-leading-end region-contact area region-post-trailing-end region" or "pre-leading-end region-leading-end region-contact area region-trailing-end region-post-trailing-end region". And from these regions, vibration levels in certain frequency ranges where the vibration level changes markedly for different road surface conditions, such as the vibration component in a low-frequency range and the vibration component in a high-frequency range in the pre-leading-end region and the contact area region, for instance, and vibration levels in frequency ranges where the vibration level does not change with different road surface conditions are extracted. Then the condition of the road surface on which the vehicle is running is estimated from the ratio between these vibration levels (see Patent Document 1, for instance).

PRIOR ART DOCUMENT

Patent Document

Patent Document 1: WO 2006/135909 A1

SUMMARY OF THE INVENTION

Problem to be Solved by the Invention

However, with the ground contact time changing with the wheel speed, the conventional method resorts to the determination of the time width of each region using the wheel speed in which the start point of a specific time position is set using a peak position, such as the trailing-end peak position appearing in the time-series waveform of tire vibration, as a reference. This not only necessitates the measurement of the wheel speed but also results in not necessarily accurate enough setting of the region width because a peak position of the time-series waveform is used as a reference.

Also, this method requires the setting of the region width for each tire size because the contact patch length varies with tire size.

The present invention has been made in view of the foregoing problems, and an object thereof is to provide a method for determining a road surface condition from the time-series waveform of tire vibration without detecting peak positions or measuring the wheel speed and to add robustness to the determination of a road surface condition against changes in tire size.

Means for Solving the Problem

The present invention relates to a method for determining a condition of a road surface with which a tire is in contact by detecting tire vibration during vehicular travel. The method includes a step (a) of detecting the tire vibration during vehicular travel, a step (b) of deriving a time-series waveform of the detected tire vibration, a step (c) of windowing the time-series waveform of the tire vibration at a predetermined time width and extracting time-series waveforms for respective time windows, a step (d) of calculating respective feature vectors from the time-series waveforms of respective time windows, a step (e) of calculating kernel functions from the feature vectors for the respective time windows calculated in the step (d) and road surface feature vectors, which are the feature vectors for the respective time windows calculated from the time-series waveforms of tire vibration obtained for each of road surface conditions calculated in advance; and a step (f) of determining the road surface condition based on values of discriminant functions using the kernel functions, in which in the step (f), the road surface condition is determined by comparing the values of the discriminant functions obtained for the respective road surface conditions.

BRIEF DESCRIPTION OF THE DRAWINGS

FIG. 10 is a diagram showing a method for calculating DTW kernels.

BEST MODE FOR CARRYING OUT THE INVENTION

Hereinafter, the invention will be described based on preferred embodiments which do not intend to limit the scope of the claims of the present invention. Not all of the combinations of the features described in the embodiments are necessarily essential to the invention.

Figure 1:
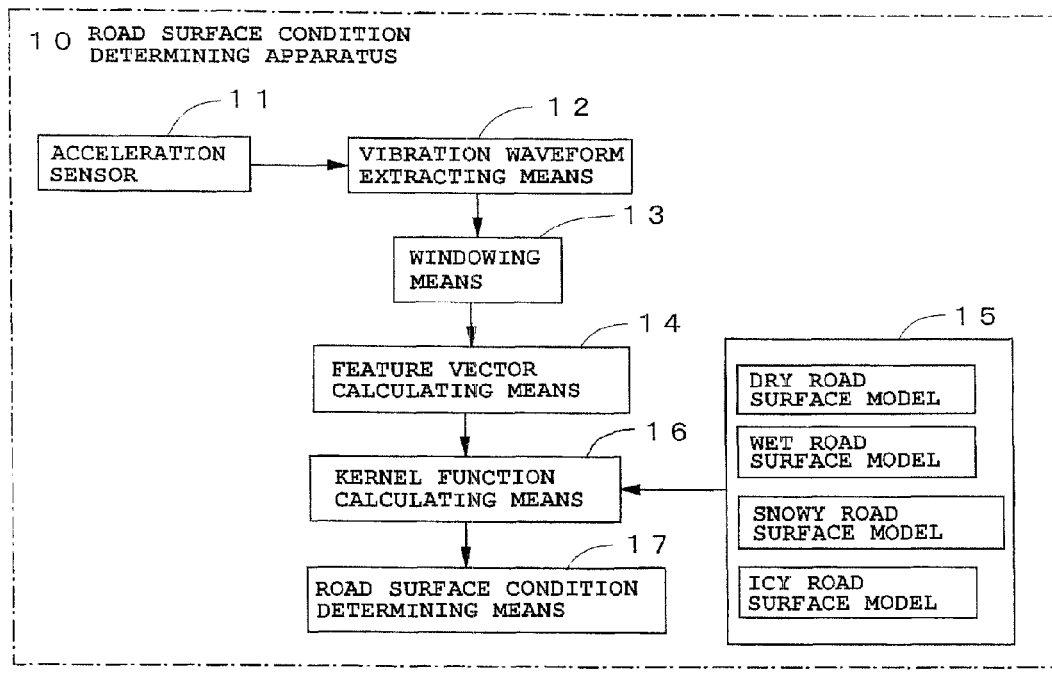
FIG. 1 is a functional block diagram showing a constitution of a road surface condition determining apparatus in accordance with a preferred embodiment of the present invention.

FIG. 1 is a functional block diagram showing a constitution of a road surface condition determining apparatus 10. The road surface condition determining apparatus 10 includes an acceleration sensor 11 as a tire vibration detecting means, a vibration waveform extracting means 12, a windowing means 13, a feature vector calculating means 14, a storage means 15, a kernel function calculating means 16, and a road surface condition determining means 17.

The series of means from the vibration waveform extracting means 12 to the road surface condition determining means 17 may be constituted by computer software and memory, such as RAM, for instance.

Figure 2:
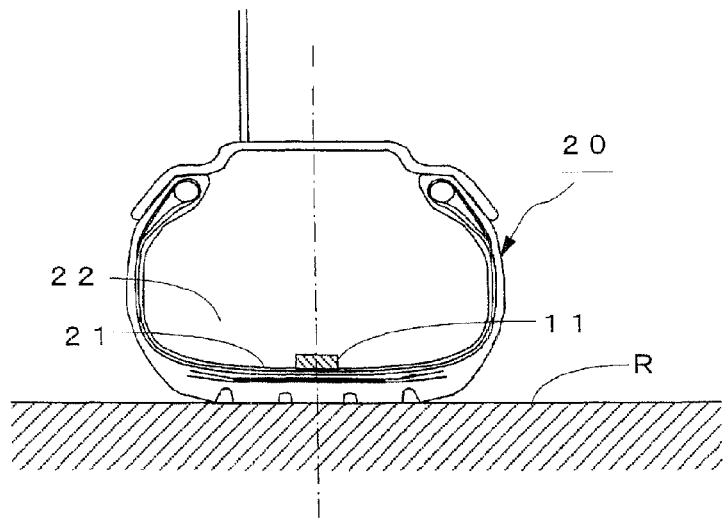
FIG. 2 is an illustration showing an example of location of an acceleration sensor.

The acceleration sensor 11 is located integrally at a substantially middle portion on the tire air chamber 22 side of the inner liner 21 of the tire 20 as shown in FIG. 2 and detects the vibration of the tire 20 inputted from a road surface R. The signals of tire vibration, which are the outputs of the acceleration sensor 11, are converted into digital signals after being amplified by an amplifier, for instance, before they are sent to the vibration waveform extracting means 12.

The vibration waveform extracting means 12 extracts a time-series waveform of tire vibration from the signals of tire vibration detected by the acceleration sensor 11 for each revolution of the tire.

Figure 3:
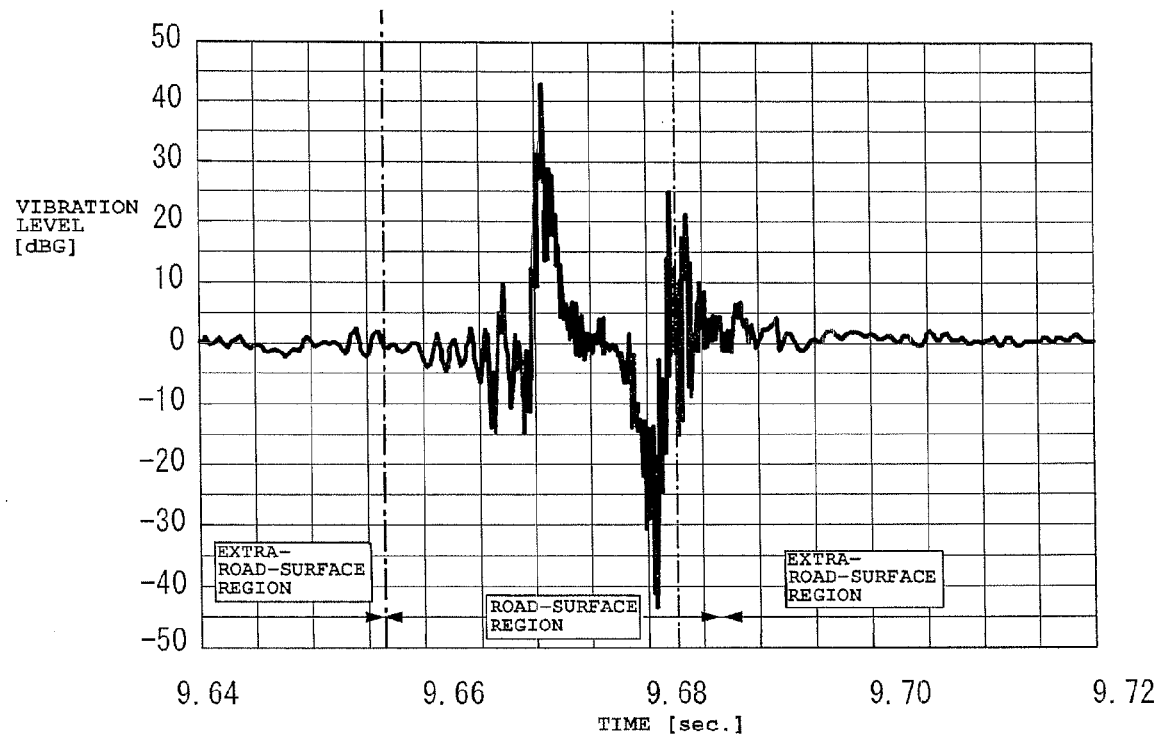
FIG. 3 is a diagram showing an example of a time-series waveform of tire vibration.

FIG. 3 is a diagram showing an example of a time-series waveform of tire vibration. The time-series waveform of tire vibration has large peaks near the leading end position and near the trailing end position. The time-series waveform of tire vibration also shows vibrations varying with the road surface condition in the pre-leading-end region $R_f$, which precedes the contact of the land portions of the tire 20 with the ground, and in the post-trailing-end region $R_k$, which follows the separation of the land portions of the tire 20 from the ground. On the other hand, the vibrations in the regions before the pre-leading-end region $R_f$ and after the post-trailing-end region $R_k$ (hereinafter referred to as "extra-road-surface regions") are little affected by the road surface, so that they show low vibration levels and contain no information on the road surface.

The windowing means 13 windows the extracted time-series waveform at predetermined time width (called time window width also) T, extracts the time-series waveforms for the respective time windows, and sends them to the feature vector calculating means 14.

Of the time-series waveforms for the respective time windows, the time-series waveforms in the regions extraneous to any of the pre-leading-end region $R_f$, the contact area region $R_p$, and the post-trailing-end region $R_k$ (hereinafter referred to as "extra-road-surface regions") contain little information on the road surface as mentioned above. In the present embodiment, therefore, the extra-road-surface time-series waveforms are not sent to the feature vector calculating means 14 so as to help raise the speed of calculating kernel functions.

It is to be noted that the extra-road-surface regions may be defined as regions having vibration levels lower than a background level, which is set for the time-series waveform of tire vibration, for instance.

Figure 4:
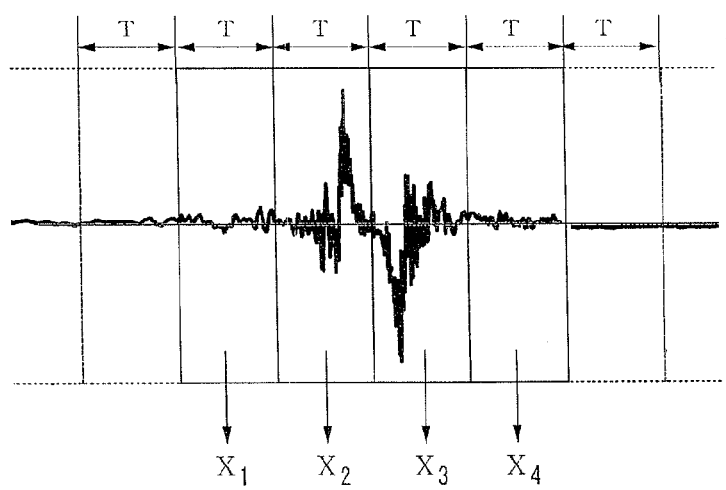
FIG. 4 is a diagram showing a method for calculating feature vectors from a time-series waveform of tire vibration.

The feature vector calculating means 14 calculates the feature vectors $X_i$ (i=1 to N: N being the number of time-series waveforms extracted for the time windows) for the time-series waveforms extracted for the respective time windows as shown in FIG. 4.

In the present embodiment, the vibration levels (power values of filtered waveforms) $a_{ik}$ (k=1 to 6) of specific frequency ranges, which are obtained by passing the time-series waveform of tire vibration through the bandpass filters of 0-0.5 kHz, 0.5-1 kHz, 1-2 kHz, 2-3 kHz, 3-4 kHz, and 4-5 kHz, respectively, are used as the feature vectors $X_i$. The feature vectors $X_i$ are $(a_{i1}, a_{i3}, a_{i4}, a_{i5}, a_{i6})$, and the number of the feature vectors $X_i$ is N.

Figure 5:
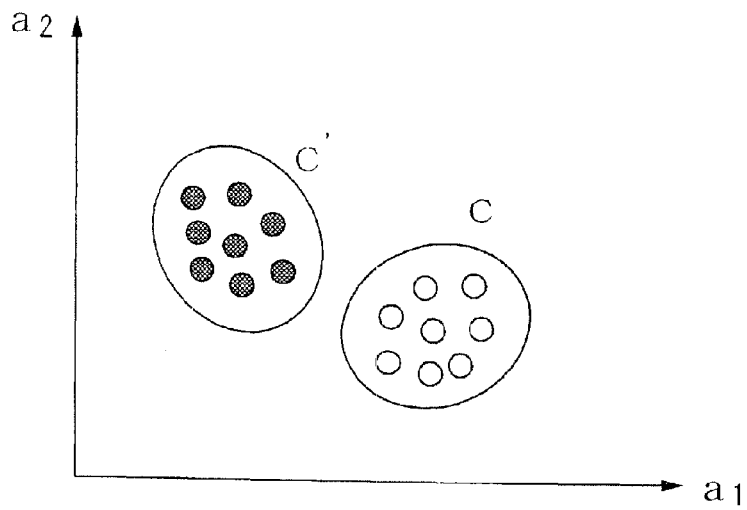
FIG. 5 is a schematic diagram showing an input space.

FIG. 5 is a schematic diagram of input space for the feature vectors $X_i$. The axes of the diagram represent the vibration levels $a_{ik}$ of the specific frequency ranges, which are feature quantities, and the points represent the feature vectors $X_i$. Although the actual input space is a 7-dimensional space of six specific frequency ranges plus one time axis, the diagram is represented 2-dimensionally (horizontal axis for $a_1$ and vertical axis for $a_2$).

For example, let us assume that a vehicle is now traveling on a DRY road surface. Then it is possible to determine whether the vehicle is running on a DRY road surface or on a SNOWY road surface if the points constituting group C can be distinguished from the feature vectors $X'_i$ constituting group C' calculated for a vehicle which is running on a SNOWY road surface.

The storage means 15 stores four predetermined road surface models for separating the DRY road surface from the other road surfaces, the WET road surface from the other road surfaces, the SNOWY road surface from the other road surfaces, and the ICY road surface from the other road surfaces, using the discriminant functions f(x) each representing a separating hyperplane.

The road surface models are derived by learning, using the input data of road surface feature vectors $Y_A(y_{jk})$, which are the feature vectors for respective time windows calculated from the time-series waveforms of tire vibration determined by operating test vehicles having a tire fitted with the acceleration sensor at various speeds on the DRY, WET, SNOWY, and ICY roads.

Note that the tire size to be used in learning may be a single size or a plurality of sizes.

The index A of the road surface feature vectors $Y_{ASV}(y_{jk})$ represents DRY, WET, SNOWY, or ICY. The index j (j=1 to M) represents the number of time-series waveforms extracted for time windows (Nos. of windows), and the index k represents the components of the vector. Also, the SV is the abbreviation of support vectors, which represent the data in the neighborhood of the discriminant boundary selected by learning.

It is to be noted that when the Global alignment kernel functions (GA kernels) or the dynamic time warping kernel functions (DTW kernels) are used as the kernel functions as in the present embodiments, the road surface feature vectors $Y_{ASV}(y_{jk})$ are each a matrix of "the number of dimensions of the vectors $y_i$ (6 here)×the number of windows N".

Hereinafter, the road surface feature vectors $Y_{ASV}(y_{jk})$ are simply referred to as $Y_{ASV}$.

The method for calculating each of the road surface feature vectors $Y_{ASV}$ is the same as one for calculating the above-described feature vectors $X_j$. For example, the DRY road surface feature vectors $Y_{DSV}$ are calculated as follows. The time-series waveform of tire vibration during vehicular travel on a DRY road surface is first windowed at time width T. Then the time-series waveforms of tire vibration of respective time windows are extracted. And the DRY road surface feature vectors $Y_D$ are calculated for the respective time-series waveforms extracted for the respective time windows. Note that the number of dimensions of vectors $y_i$ of the DRY road surface feature vectors $Y_D$ is 6, which is the same as that of the feature vectors $X_i$. After this, the support vectors $Y_{DSV}$ are selected by learning $Y_D$ as learning data by a support vector machine (SVM). It should be noted here that not all of $Y_D$ must be stored in the storage means 15, but the selected $Y_{DSV}$ only should be stored therein.

The WET road surface feature vectors $Y_{WSV}$, the SNOWY road surface feature vectors $Y_{SSV}$, and the ICY road surface feature vectors $Y_{ISV}$ can be obtained in the same way as the DRY road surface feature vectors $Y_{DSV}$.

It is critically important here that the time width T is of the same value as the time width T used in deriving the feature vectors $X_j$. If the time width T is fixed, the number M of the time-series waveforms of the time windows varies with the tire type and the vehicle speed. That is, the number M of the time-series waveforms of the time windows of the road surface feature vectors $Y_{ASV}$ is not necessarily in agreement with the number N of the time-series waveforms of the time windows of the feature vectors $X_j$. For example, when the tire type is the same, M<N if the vehicle speed in deriving the feature vectors $X_j$ is slower than the vehicle speed in deriving the DRY road surface feature vectors $Y_{DSV}$ and M>N if it is faster.

The road surface models are structured by SVM using distinctive road surface feature vectors $Y_A$ as learning data.

Figure 6:
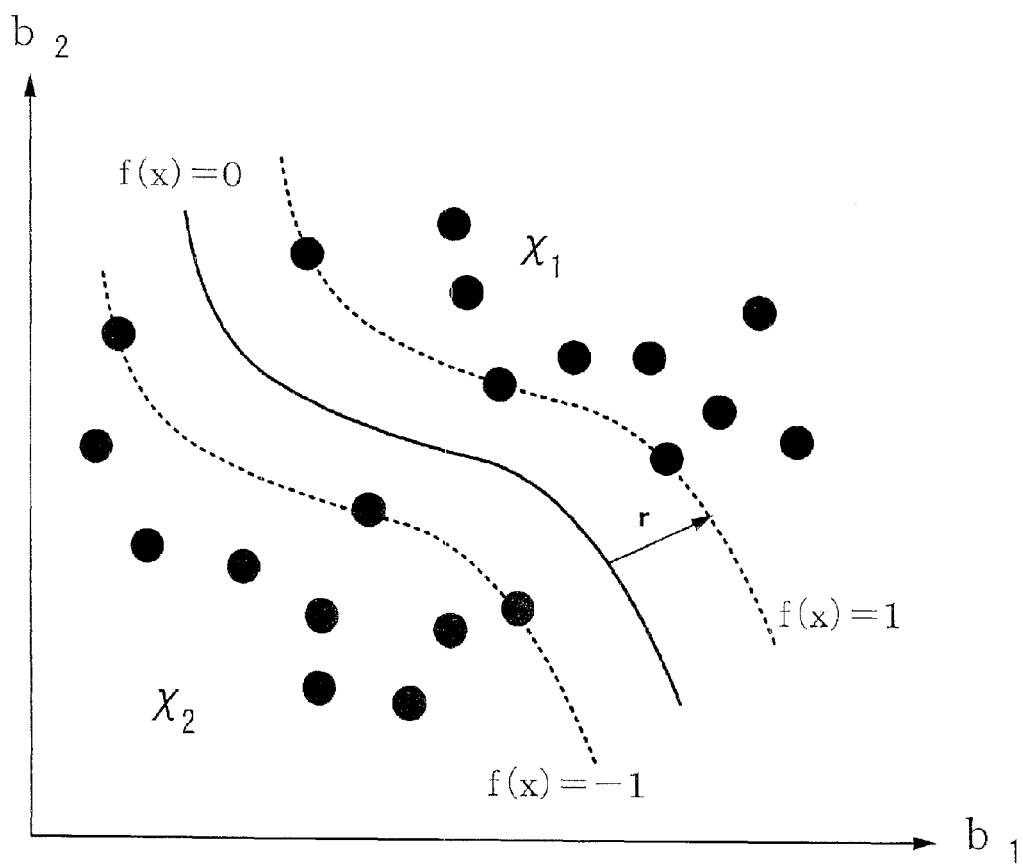
FIG. 6 is a diagram showing DRY road surface feature vectors and road surface feature vectors other than those of the DRY road surface on the input space.

FIG. 6 is a conceptual diagram showing the DRY road surface feature vectors $Y_{DSV}$ and the road surface feature vectors $Y_{nDSV}$ other than those of the DRY road surface on an input space, the black circles representing the DRY road surface feature vectors and the lighter-tinted circles the road surface feature vectors other than those of the DRY road surface.

It is to be noted that, as already mentioned, the DRY road surface feature vectors and the road surface feature vectors other than those of the DRY road surface are both matrixes. To explain how to derive the discriminant boundary between the groups, FIG. 6 represents the DRY road surface feature vectors and the road surface feature vectors other than those of the DRY road surface in 2-dimensional vectors, respectively.

The discriminant boundary between the groups cannot normally be obtained by linear separation. Therefore, using a kernel method, the road surface feature vectors $Y_{DSV}$ and $Y_{nDSV}$ are linearly separated by mapping them to a high-dimensional feature space by a nonlinear mapping $\phi$. Thus, the road surface feature vectors $Y_{DSV}$ and $Y_{nDSV}$ are non-linearly classified in the original input space.

More specifically, an optimum discriminant function $f(x)=w^T\phi(x)-b$ to discriminate the data is obtained using the set of data $X=(x_1, x_2, \ldots x_n)$ and the affiliated class $z=\{1, -1\}$. Here, the data are the road surface feature vectors $Y_{Dj}$, $Y_{nDj}$, the affiliated class $z=1$ is the DRY road surface data represented by $X_1$ in the diagram, and the affiliated class $z=-1$ is the road surface data other than that of the DRY road surface represented by $X_2$. Also, w is a weight coefficient, b is a constant, and $f(x)=0$ is the discriminant boundary.

The discriminant function $f(x)=w^T\phi(x)-b$ is optimized by use of Lagrange's method of undetermined multipliers, for instance. This optimization problem can be substituted with the following expressions (1) and (2).

(Formula 1)

$$\text{mazimaize} \quad \sum_\alpha \lambda_\alpha - \frac{1}{2}\sum_{\alpha,\beta}\lambda_\alpha\lambda_\beta z_\alpha z_\beta \phi(x_\alpha)\phi(x_\beta) \quad (1)$$

-continued $$\text{subjecto to} \quad \sum_\alpha \lambda_\alpha z_\alpha = 0, \lambda_\alpha > 0 \quad (2)$$

Here $\alpha$ and $\beta$ are the indexes of a plurality of learning data. Also, $\lambda$ is Lagrange's multipliers, and $\lambda>0$.

At this time, by replacing the inner product $\phi(x_\alpha)\phi(x_\beta)$ by the kernel function $K(x_\alpha, x_\beta)$, the discriminant function $f(x)=w^T\phi(x)-b$ can be made nonlinear. It is to be noted that $\phi(x_\alpha)\phi(x_\alpha)$ is the inner product after $x_\alpha$ and $x_\beta$ are mapped to a high-dimensional space by a mapping $\phi$.

The Lagrange multiplier $\lambda$ in the above equation (2) can be obtained using an optimization algorithm such as steepest decent method or SMO (sequential minimal optimization). In doing so, the use of the kernel function makes it unnecessary to obtain a high-dimensional inner product. Accordingly, the computational time can be shortened markedly.

Figure 7:
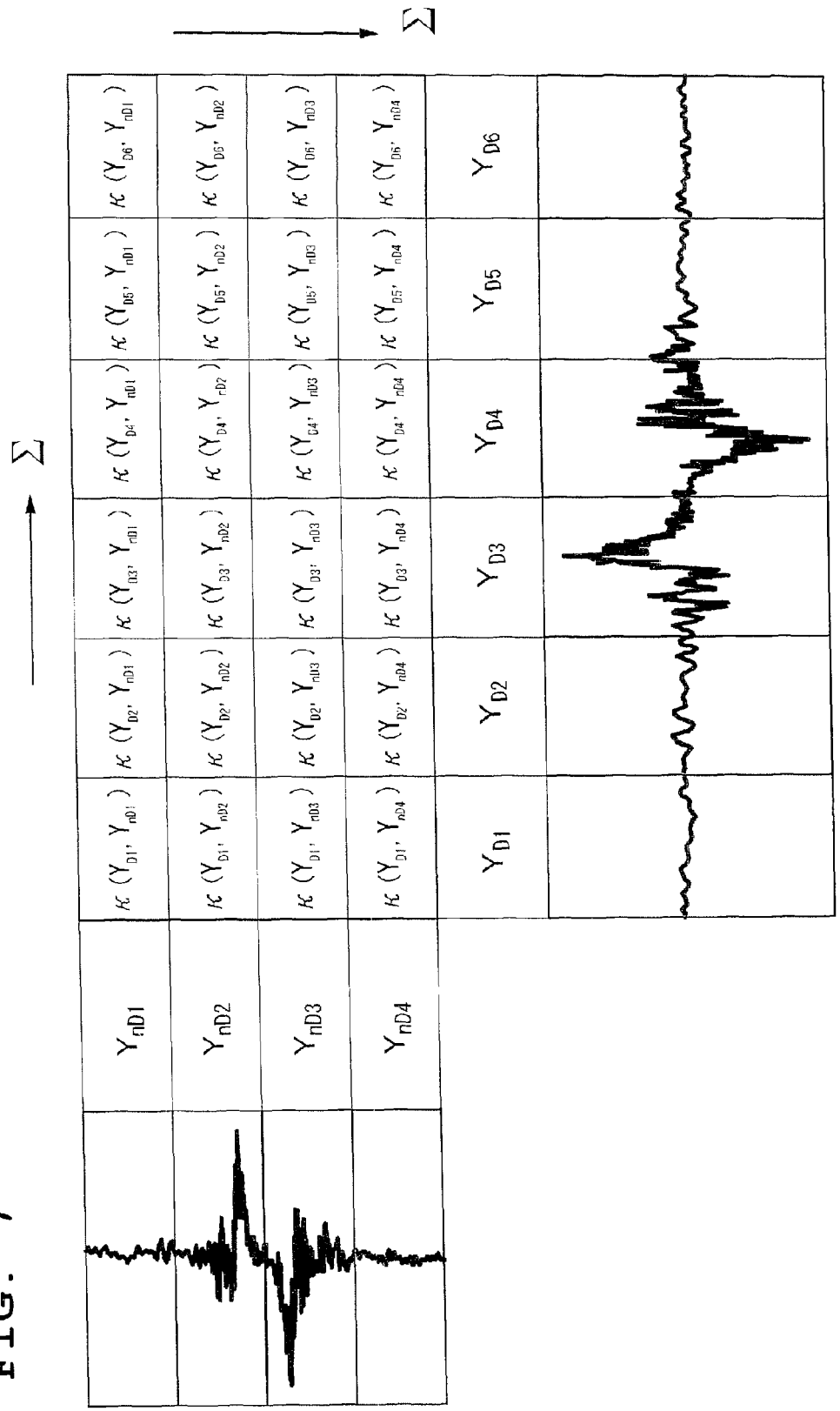
FIG. 7 is a diagram showing a method for calculating GA kernels of the DRY road surface feature vectors and the road surface feature vectors other than those of the DRY road surface.

In the present embodiment, the global alignment kernel functions (GA kernels) are used as the kernel functions $K(x_\alpha, x_\beta)$. As shown in FIG. 7 and the following equations (3) and (4), the GA kernel $K(x_\alpha, x_\beta)$ is the function consisting of the total sum or total product of local kernels $k_{ij}(x_i, x_j)$, which represents the degree of similarity between the DRY road surface feature vectors $x_i=Y_{Di}$ and the road surface feature vectors $x_j=Y_{nDi}$ other than those of the DRY road surface, and allows direct comparison between time-series waveforms of different time lengths.

The local kernels $k_{ij}(x_i, x_j)$ are derived for the respective windows at time interval T.

Note that FIG. 7 shows an example of GA kernels obtained for the DRY road surface feature vectors $Y_{Dj}$ with six time windows and the road surface feature vectors $Y_{nDj}$ other than those of the DRY road surface with four time windows.

(Formula 2)

$$K(x_\alpha, x_\beta) = \sum_{i=1}^{m}\sum_{j=1}^{n} k_{ij}(x_{\alpha i}, x_{\beta j}) \quad (3)$$

$$k_{ij}(x_{\alpha i}, x_{\beta j}) = \exp\left(-\frac{\|x_{\alpha i} - x_{\beta j}\|^2}{\sigma^2}\right) \quad (4)$$

where $\|x_{\alpha i}-x_{\beta j}\|$ is the distance (norm) between feature vectors and $\sigma$ is a constant.

The DRY road surface and the road surface other than the DRY road surface can be distinguished from each other with high accuracy by giving a margin to the discriminant function $f(x)$, which is the separating hyperplane between the DRY road surface feature vectors $Y_{Dj}$ and the road surface feature vectors $Y_{nDj}$ other than those of the DRY road surface.

The margin as used herein is the distance from the separating hyperplane to the closest sample (support vector). The separating hyperplane, which is the discriminant boundary, is $f(x)=0$. And the DRY road surface feature vectors $Y_{Dj}$ are all in the domain of $f(x)\geq+1$, whereas the road surface feature vectors $Y_{nDj}$ other than those of the DRY road surface are in the domain of $f(x)\leq-1$.

The DRY road surface model for distinguishing the DRY road surface from the other road surfaces is an input space having support vectors $Y_{DSV}$ at a distance of $f(x)=+1$ and support vectors $Y_{nDSV}$ at a distance of $f(x)=-1$. There are normally a plurality of $Y_{DSV}$ and $Y_{nDSV}$.

The same applies to the WET road surface model for distinguishing the WET road surface from the other road surfaces, the SNOWY road surface model for distinguishing the SNOWY road surface from the other road surfaces, and the ICY road surface model for distinguishing the ICY road surface from the other road surfaces.

The kernel function calculating means 16 calculates the respective GA kernels $K_D(X, Y)$, $K_W(X, Y)$, $K_S(X, Y)$, and $K_I(X, Y)$ from the feature vectors $X_i$ calculated by the feature vector calculating means 14 and the support vectors $Y_{ASV}$ and $Y_{nASV}$ (A=D, W, S, I) of the DRY model, WET model, SNOWY model, and ICY model stored in the storage means 15.

Figure 8:
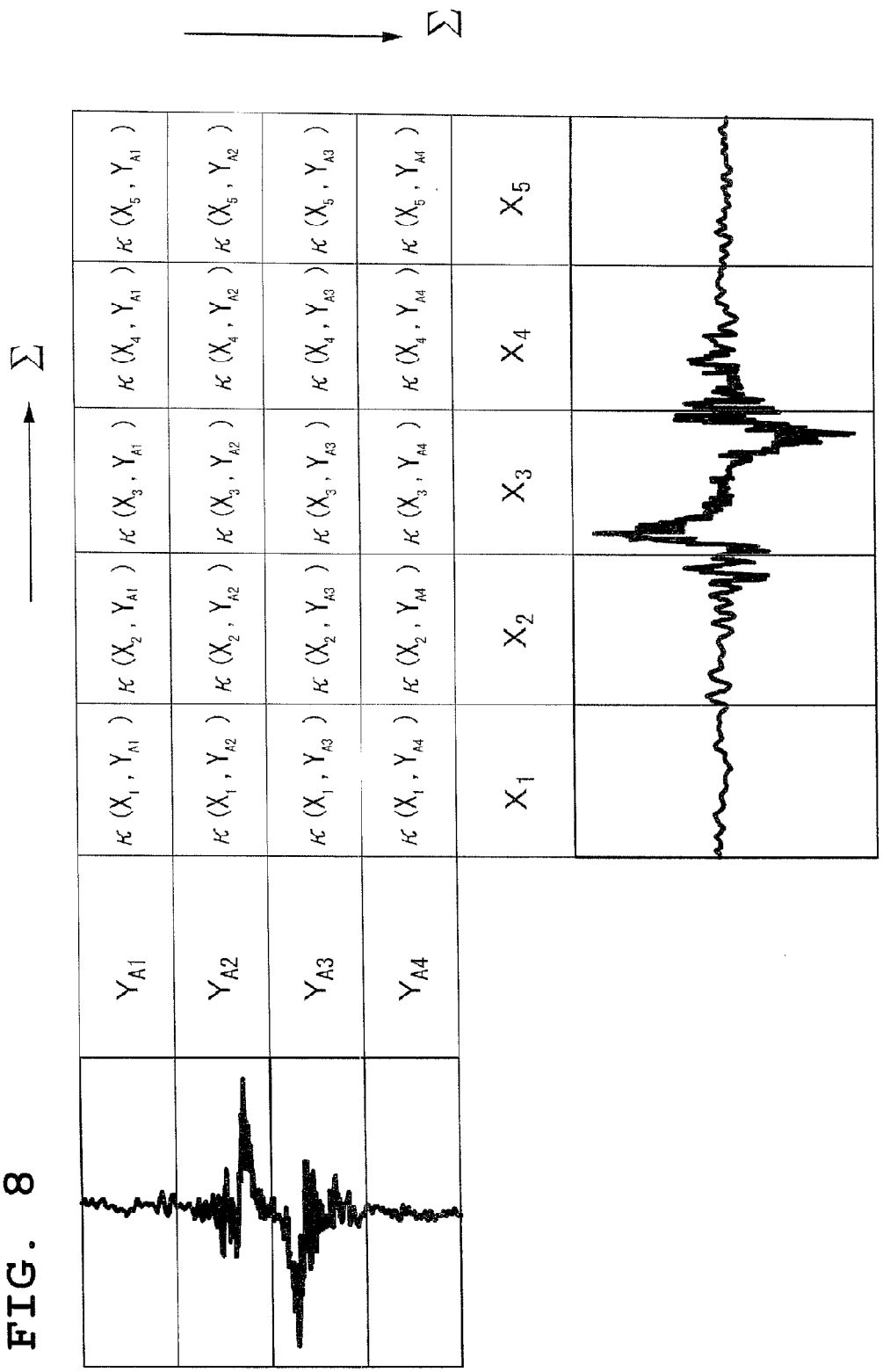
FIG. 8 is a diagram showing a method for calculating GA kernels of the calculated feature vectors and road surface feature vectors.

As shown in FIG. 8 also, the GA kernel K (X, Y) is the function consisting of the total sum or total product of local kernels $K_{ij}(X_i, Y_j)$ when $x_i$ is the feature vector $X_i$ and $x_j$ is the road surface feature vectors $Y_{Aj}$ and $Y_{nAj}$ in the equation 2, by which time-series waveforms of different time lengths may be compared directly. It is to be noted that FIG. 8 shows an example where $x_j$ is the road surface feature vectors $Y_{Aj}$, the number of time windows of the feature vectors $X_i$ is n=5, and the number of time windows of the road surface feature vectors $Y_{Aj}$ is m=4.

As this example shows, the degree of similarity between the feature vectors $X_i$ and $Y_{Aj}$ (or between $X_i$ and $Y_{nAj}$) can be obtained even when there is a difference between the number n of the time-series waveforms of the time windows used in deriving the feature vectors $X_i$ and the number m of the time-series waveforms of the time windows used in deriving the road surface feature vectors $Y_{Aj}$ (or $Y_{nAj}$).

The road surface condition determining means 17 determines the condition of a road surface based on the values of four discriminant functions $f_A(x)$ using kernel functions $K_A(X,$ respectively, as shown in the following equations (5) to (8) (A=D, W, S, I).

(Formula 3)

$$f_D = \sum_{a=1}^{N_{DSV}} \lambda_{Da} z_{Da} K_D(X, Y_a) - b_D \quad (5)$$

$$f_W = \sum_{a=1}^{N_{WSV}} \lambda_{Wa} z_{Wa} K_W(X, Y_a) - b_W \quad (6)$$

$$f_S = \sum_{a=1}^{N_{SSV}} \lambda_{Sa} z_{Sa} K_S(X, Y_a) - b_S \quad (7)$$

$$f_I = \sum_{a=1}^{N_{ISV}} \lambda_{Ia} z_{Ia} K_I(X, Y_a) - b_I \quad (8)$$

where $f_D$ is the discriminant function for discriminating the DRY road surface from the other road surfaces, $f_W$ is the discriminant function for discriminating the WET road surface from the other road surfaces, $f_S$ is the discriminant function for discriminating the SNOWY road surface from the other road surfaces, and $f_I$ is the discriminant function for discriminating the ICY road surface from the other road surfaces.

Also, $N_{DSV}$ is the number of support vectors of the DRY model, $N_{WSV}$ is the number of support vectors of the WET model, $N_{SSV}$ is the number of support vectors of the SNOWY model, and $N_{ISV}$ is the number of support vectors of the ICY model.

The value of the Lagrange multiplier $\lambda_D$ of the discriminant function, for instance, is obtained by learning in deriving the discriminant function for discriminating the DRY road surface from the other road surfaces.

In the present embodiment, the discriminant functions $f_D$, $f_W$, $f_S$, and $f_I$ are calculated, respectively, and a road surface condition is determined from the discriminant function that shows the largest value of the calculated discriminant functions $f_A$.

Figure 9:
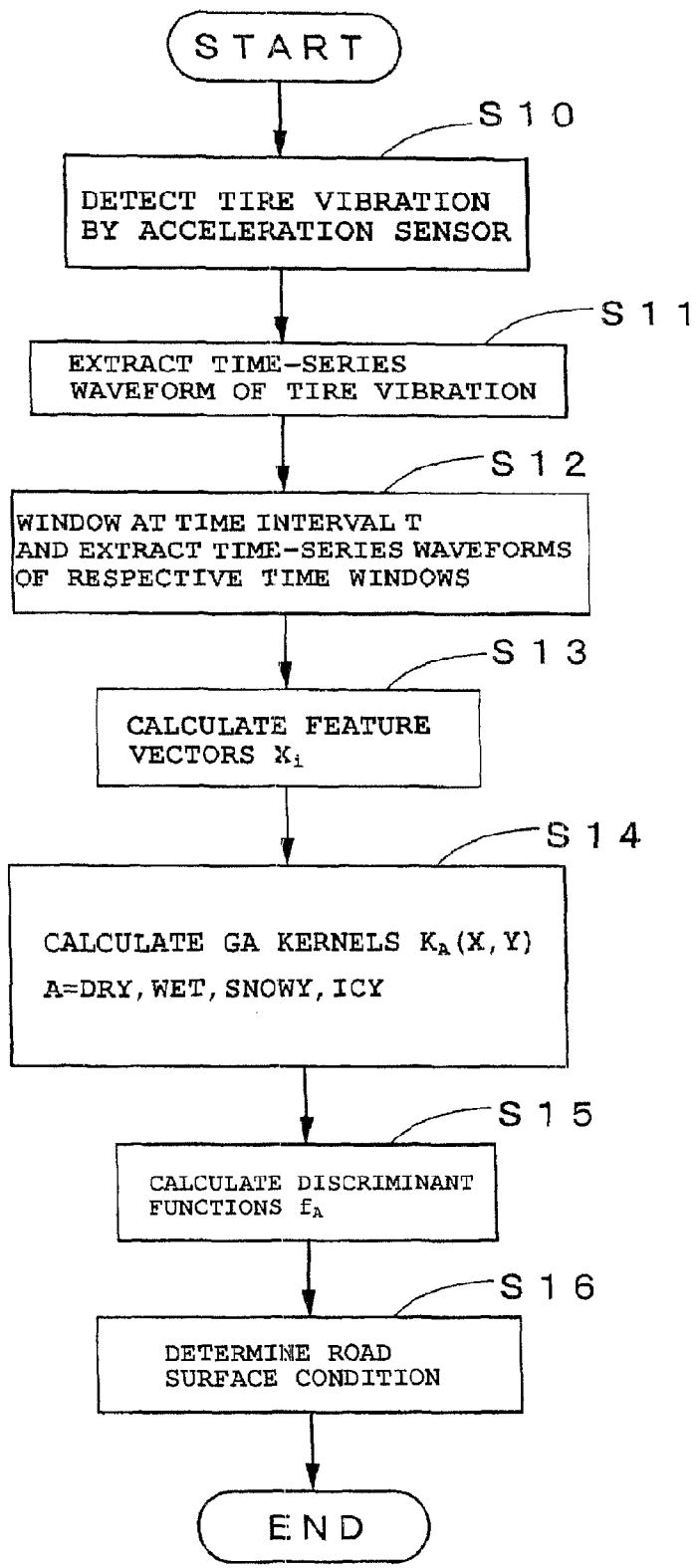
FIG. 9 is a flowchart showing a method for determining a road surface condition according to the present invention.

Next, a method for determining the condition of a road surface on which the tire 2 is running by the use of a road surface condition determining apparatus 10 is explained by referring to the flowchart of FIG. 9.

First, tire vibration caused by the input from a road surface R on which the tire 20 is running is detected by an acceleration sensor 11 (step S10). And a time-series waveform of the tire vibration is extracted from the signals of the detected tire vibration (step S11).

Then the derived time-series waveform of tire vibration is windowed at predetermined time width T, and the time-series waveforms for the respective time windows are obtained. Here, the number of the time-series waveforms of tire vibration for the respective time windows is assumed to be m (step S12).

Next, feature vectors $X_i = (x_{i1}, x_{i2}, x_{i3}, x_{i4}, x_{i5}, x_{i6})$ are calculated for the time-series waveforms extracted for the respective time windows (step S13). In the present embodiment, the time width T is set at 3 msec. Also, the number of feature vectors $X_i$ is 6.

The components $x_{i1}$ to $x_{i6}$ (i=1 to m) of the feature vector $X_i$ are the power values of filtered time-series waveforms of tire vibration as described already.

Next, the local kernels $K_{ij}(X_i, Y_j)$ are calculated from the calculated feature vectors $X_i$ and the support vectors $Y_{Ak}$ of the road surface models stored in the storage means 15. Then the total sum of the local kernels $K_{ij}(X_i, Y_j)$ is obtained, and the global alignment kernel functions $K_D(X, Y)$, $K_W(X, Y)$, $K_S(X, Y)$, and $K_I(X, Y)$ are calculated, respectively (step S14).

And four discriminant functions $f_D(x)$, $f_W(x)$, $f_S(x)$, and $f_I(x)$ using kernel functions $K_A(X, Y)$ are calculated, respectively (step S15). Then the values of the calculated discriminant functions $f_A(x)$ are compared with each other, and the road surface condition of the discriminant function that shows the largest value is determined to be the condition of the road surface on which the tire 20 is running (step S16).

In the present embodiment, as thus far described, a time-series waveform of tire vibration detected by an acceleration sensor 11 is windowed by a windowing means 13. And time-series waveforms of tire vibration for the respective time windows are extracted, and the feature vectors $X_i$ are calculated for the respective time windows. Then kernel functions $K_A(X, Y)$ for the feature vectors X and the road surface feature vectors Y are obtained. And the condition of a road surface on which the tire 20 is running is determined from the values of four discriminant functions $f_D(x)$, $f_W(x)$, $f_S(x)$, and $f_I(x)$ using the kernel functions $K_A(X, Y)$. As a result, a road surface condition can be determined without detecting peak positions or measuring the wheel speed.

Also, the feature vectors $X_i$ used in the present embodiment are the vibration levels of specific frequency ranges (power values of filtered waveforms), which are a factor reflecting the differences in road surface condition better than the time-series waveform. This allows the determination of a road surface condition with greater accuracy.

Also, since a road surface condition can be determined independently of the contact patch length, the robustness of the method against changes in tire size can be improved.

Note that the tire vibration detecting means, which has been described as an acceleration sensor 11 in the foregoing embodiment, may be any of other vibration detecting means, such as a pressure sensor. Also, the location of the acceleration sensor 11 may be other than described, such as one each in positions a given axial distance away from the axial center of a tire or the location within a block of a tire. Also, the number of the acceleration sensors 11 is not limited to one, but a plurality of acceleration sensors 11 may be located in a plurality of positions around the circumference of a tire.

Also, in the foregoing example, the feature vectors $X_i$ are the power values $x_{ik}$ of the filtered waveforms. But the time-varying dispersions of the $x_{ik}$ of the filtered waveforms may also be used as the feature vectors $X_i$. The time-varying dispersions can be expressed as Log $[x_{ik}(t)^2 + x_{ik}(t-1)^2]$.

Or the feature vectors $X_i$ may be Fourier coefficients, which are vibration levels of specific frequency ranges when a Fourier transform is performed on a time-series waveform of tire vibration, or cepstrum coefficients.

The cepstrum can be obtained either by performing a Fourier transform again on the waveform after a Fourier transform by assuming it as a spectral waveform or by further obtaining AR coefficients by assuming the AR spectrums as waveforms (LPC Cepstrum) and can characterize the shape of the spectrums without being affected by the absolute level, hence a determination accuracy is improved than a case where frequency spectrums derived by a Fourier transform are used.

Also, in the foregoing embodiment, the GA kernels are used as the kernel functions. But the dynamic time warping kernel functions (DTW kernels) may be used instead as shown in the following equation (9) or equation (10):

(Formula 4)

$$K_1'(x_\alpha, x_\beta) = \exp\left(-\operatorname*{argmin}_{\pi \in A(x_{\alpha j}, x_{\beta j})} \frac{1}{|\pi|} \sum_{i=1}^{|\pi|} \|x_{\alpha \pi_1(i)} - x_{\beta \pi_2(i)}\|^2\right) \quad (9)$$

or $$K_2'(x_\alpha, x_\beta) = -\operatorname*{argmin}_{\pi \in A(x_{\alpha j}, x_{\beta j})} \frac{1}{|\pi|} \sum_{i=1}^{|\pi|} \exp\left(-\frac{\|x_{\alpha \pi_1(i)} - x_{\beta \pi_2(i)}\|^2}{\sigma^2}\right) \quad (10)$$

where $\pi$ is a path and $A(x_i, x_j)$ are all the possible paths.

As shown in FIG. 10, the DTW kernel K'(X, Y) consists of a total sum of the paths along which the total sum of $K'_{ij}(X_i, Y_j)$ becomes the largest or the smallest of all the paths as shown by a thick solid line, for example, when the total sum of the local kernels $K_{ij}(X_i, Y_j)$ is obtained.

In the example of FIG. 10, if the number of time windows of the feature vectors $X_i$ is n=5 and the number of time windows of the road surface feature vectors $Y_j$ is m=4, the DTW kernel $K_1'(X, Y)$ will be expressed as follows when the local kernel $K_{ij}(X_i, Y_j)$ is expressed as equation (11).

(Formula 5)

$$K'_{ij}(X_i, Y_j) = \|X_i - Y_j\|^2 \quad (11)$$

$$K_1'(X, Y) = \quad (12)$$
$$\exp\left\{-\frac{1}{5}(\|X_1 - Y_1\|^2 + \|X_2 - Y_1\|^2 + \|X_3 - Y_2\|^2 + \|X_4 - Y_3\| + \|X_5 - Y_4\|^2)\right\}$$

It is to be noted that the sum, difference, product, or quotient of the GA kernel and DTW kernel may be used as the kernel function. If the GA kernel and the DTW kernel are used as the kernel function like this, then a road surface condition can be determined with excellent accuracy because the time-series waveform can be handled directly.

Example

Four test vehicles A to D of different tire sizes were each fitted with a tire having an acceleration sensor installed thereon. Each of those test vehicles was operated at speeds ranging from 30 to 90 km/h on each of the DRY, WET, SNOWY, and ICY road surfaces. Then kernel functions were calculated from the time-series waveforms of tire vibrations thus obtained. And Table 1 below shows the results of the determination of road surface conditions using the models learned by SVM models.

TABLE 1

|  | Test vehicle A | Test vehicle B | Test vehicle C | Test vehicle D |
|---|---|---|---|---|
| GAK-LPG | 100.0 | 84.6 | 85.8 | 90.4 |
| GKA-BPF | 100.0 | 96.7 | 85.8 | 100.0 |
| GAK-LPC + GKA-BPF | 100.0 | 96.3 | 88.8 | 97.9 |

Percentage of correct determinations [%]

Four SVM models were structured, which were for the determination of DRY and other road surface conditions, WET and other road surface conditions, SNOWY and other road surface conditions, and ICY and other road surface conditions, respectively. And the road surface condition of the model which showed the highest SVM score as a result of the test data other than those used in learning inputted in the respective models was determined to be the condition of the road surface on which the vehicle was running.

Test vehicle A was a front-drive vehicle, and the tire size was 165/70R14.

Test vehicle B was a rear-drive vehicle, and the tire size was 195/65R15.

Test vehicle C was a front-drive vehicle, and the tire size was 195/60R15.

Test vehicle D was a front-drive vehicle, and the tire size was 185/70R14.

The tread pattern of each tire was all fixed (Bridgestone: BLIZZK REV02).

The data used in learning included ⅔ of the total data obtained with test vehicle A.

Also, the road surface conditions were determined in three cases, that is, a case where the LPC Cepstrums were used as the feature vectors X, a case where the power values $x_{ik}$ of bandpass filtered waveforms were used, and a case where both the LPC Cepstrums and the power values $x_{ik}$ of bandpass filtered waveforms were used, and the results were shown as the percentages of correct determinations (%).

As is clear from Table 1, the percentages of correct determinations as high as 85% or above were achieved with all the test vehicles A to D. In particular, when both the LPC Cepstrums and the power values $x_{ik}$ of bandpass filtered waveforms were used, the percentages of correct determinations achieved were as high as 95% or above with the test vehicles used except for test vehicle C with a great tire sectional width and low flattering ratio. Therefore, it has been confirmed that the application of the present invention will accomplish the determination of road surface conditions with excellent accuracy.

In the foregoing specification, the invention has been described with reference to specific embodiments thereof. However, the technical scope of this invention is not to be considered as limited to those embodiments. It will be evident to those skilled in the art that various modifications and changes may be made thereto without departing from the broader spirit and scope of the invention. It will also be evident from the scope of the appended claims that all such modifications are intended to be included within the technical scope of this invention.

According to the present invention, the time-series waveform of tire vibration can be divided without detecting peak positions or measuring the wheel speed. At the same time, the robustness of the method for determining road surface conditions against changes in tire size can help improve the accuracy of vehicle control, such as ABS and VSC, markedly.

DESCRIPTION OF REFERENCE NUMERALS 10 road surface condition determining apparatus
11 acceleration sensor
12 vibration waveform extracting means
13 windowing means
14 feature vector calculating means
15 storage means
16 kernel function calculating means
17 road surface condition determining means
20 tire
21 inner liner
22 tire air chamber
R road surface

The invention claimed is:

1. A method for determining a condition of a road surface with which a tire is in contact by detecting tire vibration during vehicular travel, the method comprising:
  detecting the tire vibration during vehicular travel;
  deriving a time-series waveform of the detected tire vibration;
  windowing the time-series waveform of the tire vibration at a predetermined time width and extracting time-series waveforms for respective time windows;
  calculating respective feature vectors from the time-series waveforms of the respective time windows;
  calculating kernel functions from the feature vectors for the respective time windows and road surface feature vectors, which are the feature vectors for the respective time windows calculated from the time-series waveforms of tire vibration obtained for each of road surface conditions calculated in advance; and
  determining the road surface condition based on values of discriminant functions using the kernel functions, wherein in the determining, the road surface condition is determined by comparing the values of the discriminant functions obtained for the respective road surface conditions.

2. The method for determining a road surface condition according to claim 1, wherein the feature vectors to be used are one, two, or all of vibration levels of specific frequency ranges of the time-series waveforms of the respective time windows extracted by windowing, time-varying dispersions of vibration levels of the specific frequency ranges, and cepstrum coefficients of the time-series waveforms, and
  wherein the vibration levels of the specific frequency ranges are vibration levels of the specific frequency ranges derived from frequency spectrums of the time-series waveforms of the time windows extracted by windowing or vibration levels of the specific frequency ranges derived from the time-series waveforms obtained by passing the time-series waveforms of the respective time windows extracted by windowing through bandpass filters.

3. The method for determining a road surface condition according to claim 1, wherein the kernel functions are global alignment kernel functions or dynamic time warping kernel functions or a sum, a difference, a product, or a quotient of these two kernel functions.

4. An apparatus for determining a condition of a road surface with which a tire is in contact by detecting tire vibration during vehicular travel, the apparatus comprising:
  a tire vibration detecting unit disposed on an air chamber side of an inner liner portion of a tire tread, and configured to detect the tire vibration during vehicular travel;
  a windowing unit configured to window a time-series waveform of the tire vibration detected by the tire vibration detecting unit at a predetermined time width and extracting time-series waveforms of the tire vibration for respective time windows;
  a feature vector calculating unit configured to calculate feature vectors having as components thereof vibration levels of specific frequencies in the time-series waveforms extracted for the respective time windows or feature vectors having as components thereof functions of the vibration levels;
  a storage unit configured to store road surface feature vectors which are feature vectors for the respective time windows calculated from time-series waveforms of the tire vibration obtained for each of road surface conditions calculated in advance;
  a kernel function calculating unit configured to calculate kernel functions from the feature vectors for the respective time windows calculated by the feature vector calculating unit and the road surface feature vectors stored in the storage unit; and
  a road surface condition determining unit configured to determine the road surface condition based on values of discriminant functions using the kernel functions, wherein the road surface condition determining unit determines the road surface condition by comparing the values of the discriminant functions obtained for the respective road surface conditions.

* * * * *